United States Patent Office 3,040,096
Patented June 19, 1962

3,040,096
1,3-DIAMINOADAMANTANE DINITRITE AND METHOD OF PREPARATION
George W. Smith, Woodbury, N.J., assignor to E. I. du Pont de Nemours and Company, Wilmington, Del., a corporation of Delaware
No Drawing. Filed Dec. 22, 1959, Ser. No. 861,201
2 Claims. (Cl. 260—563)

The present invention relates to a novel derivative of adamantane and its preparation.

The new compound of this invention is 1,3-diaminoadamantane dinitrite. It is a white solid, stable up to a temperature of 165° C. It has valuable properties which make it an industrially useful chemical. The compound is a particularly effective corrosion inhibitor over a wide temperature range.

1,3-diaminoadamantane dinitrite is obtained in accordance with the invention by contacting 1,3-diaminoadamantane with nitric oxide in the presence of cupric chloride. The following example illustrates a specific method of carrying out a process of the invention. Parts are by weight.

*Example*

Nitric oxide at a pressure of 200–300 p.s.i.ga. was charged to a glass-lined stainless steel reactor containing 4.4 parts of 1,3-diaminoadamantane, 0.06 part of cupric chloride, 16 parts of methanol, and 5 parts of water. The mixture was reacted for 3 hours at 70° C., after which it was cooled to room temperature. The resulting dark reaction mixture was concentrated to a solid residue, and the last traces of water were removed azeotropically with ethanol. Upon the addition of 40 parts of ethanol and 35 parts of ether, the dark material dissolved leaving a white, crystalline material, which was filtered off. This solid was obtained in the amount of 1.2 parts and had a decomposition temperature of 157–159° C. After recrystallization from a mixture of methanol and acetone, the white solid obtained had a sharp decomposition temperature of 165.5° C. The elemental analysis of the product was as follows.

Found: C, 46.36, 46.38; H, 7.82, 7.96; N, 21.10, 21.28.
Calculated for $C_{10}H_{20}N_4O_4$: C, 46.14; H, 7.75; N, 21.53.

The elemental content of the compound therefore agreed closely with that calculated for $C_{10}H_{20}N_4O_4$, the empirical formula of 1,3-diaminoadamantane dinitrite. Confirmation of the structure of the compound as the nitrite salt was obtained from spectral data and chemical tests. The infrared spectrum of the compound was one which is characteristic of amine salts. The presence of the $NH_3^+$ group was confirmed by a continuous series of bands from $3.5\mu$–$4.0\mu$ and bands at about $4.75\mu$, $6.20\mu$, $6.45\mu$, and $13.85\mu$. A strong band at $8.3\mu$ and a sharp medium-intensity band at $12.25\mu$ identified the anionic fragment of the salt as the nitrite. The presence of nitrite ion also was confirmed by a positive Griess test. Thus, the spectral data, chemical tests, and elemental analysis established that the compound was 1,3-diaminoadamantane dinitrite:

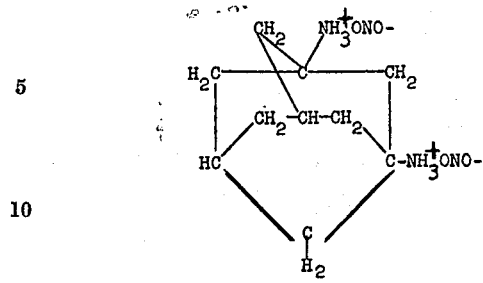

A 0.005% by weight solution of 1,3-diaminoadamantane dinitrite in benzene was effective in preventing the corrosion of steel panels subjected to the action of dilute aqueous solutions of sodium chloride. Even after 3.5 months, the panels showed only slight evidence of rusting. Similar results were obtained in tests in which the dinitrite was applied as a solution in a commercial paint thinner.

The 1,3-diaminoadamantane utilized as the starting material in the process of the invention is readily obtainable by the method disclosed in copending, coassigned application Serial Number 775,393, filed on November 21, 1958, by Harry D. Williams and the present inventor, in which adamantane is nitrated to 1,3-dinitroadamantane and the latter converted to the corresponding diamine by catalytic hydrogenation.

While methanol has been found to be a particularly useful solvent, as illustrated in the foregoing detailed example, other solvents such as the lower molecular weight aliphatic alcohols, pyridine, and other conventional solvents that are not reactive in the process can be used. The reaction conditions used in the process, e.g., reaction temperature, reaction time, and catalyst concentration, are somewhat dependent on each other. That is, the fixing of any one of these conditions will depend on the other conditions selected. For example, the reaction can be carried out at a temperature ranging from room temperature to the decomposition temperature of the dinitrite, but preferably from 50° C. to 100° C. As the reaction temperature is lowered, a larger amount of cupric chloride or a longer reaction time will be necessary. Generally, however, the cupric chloride, which serves as a catalyst, will be used in the amount of 0.001–0.1 mole per mole of diamine. Within the operable temperature range, reaction times ranging from 15 minutes to several hours will be required. The reaction preferably is carried out at superatmospheric pressure, for example at a pressure ranging from 50 to 1000 p.s.i.ga.

The invention has been described in detail in the foregoing. However, it will be obvious to those skilled in the art that many modifications are possible without departure from the scope of the invention. Therefore, I intend to be limited only by the following claims.

I claim:
1. 1,3-diaminoadamantane dinitrite.
2. A process for preparing 1,3-diaminoadamantane dinitrite which comprises contacting 1,3-diaminoadamantane with nitric oxide in the presence of cupric chloride at a temperature between room temperature and the decomposition temperature of said dinitrite and a pressure of 50 to 1000 p.s.i.ga. and thereafter separating said dinitrite from the reaction mixture.

References Cited in the file of this patent

Prelog et al.: Ber. Deut. Chem., vol. 74, pages 1769–1772 (1941).